United States Patent [19]
Sankaranarayanan et al.

[11] Patent Number: 6,134,274
[45] Date of Patent: Oct. 17, 2000

[54] METHOD AND APPARATUS FOR ALLOCATING DATA FOR TRANSMISSION VIA DISCRETE MULTIPLE TONES

[75] Inventors: Lalitha Sankaranarayanan, Bedminster; Ranjan V. Sonalkar, North Caldwell, both of N.J.

[73] Assignee: AT&T Corp, New York, N.Y.

[21] Appl. No.: 08/997,167

[22] Filed: Dec. 23, 1997

[51] Int. Cl.[7] .................................................. H04L 27/04
[52] U.S. Cl. .......................... 375/295; 375/296; 375/260; 375/254; 704/229; 704/200
[58] Field of Search ................... 375/296, 260, 375/347, 244, 254, 241, 295; 704/229, 200, 500, 205

[56] References Cited

U.S. PATENT DOCUMENTS

| | | | |
|---|---|---|---|
| 5,206,884 | 4/1993 | Bhaskar | 375/254 |
| 5,235,671 | 8/1993 | Mazor | 704/200 |
| 5,684,922 | 11/1997 | Miyakawa et al. | 704/229 |
| 5,752,225 | 5/1998 | Fielder | 704/229 |
| 5,822,374 | 10/1998 | Levin | 375/260 |

OTHER PUBLICATIONS

Leke et al., A Maximum Rate Loading Algotithm for Discrete Multitone Modulation, IEEE, pp. 1514–1518, Aug. 1997.
Fischer et al. A New Loading Algorithm for Discrete Multitone Transmission, IEEE, p. 724728, May 1996.
Chow et al., A Practical Discrete Multitone Tranceiver Loading Algorithm for Data Transmission over Spectrally Shaped Channel, IEEE, p. 773775, Feb. 1995.
American National Standards Institite, Standards Document—T1.413–1995; "Network and Customer Installation Interfaces—Asymmetric Digital Subscriber Line (ADSL) Metallic Interface"; Approved Aug. 18, 1995, pages: cover page; two inside sheets; i–vi; 1–115.
"Multicarrier Modulation for Data Transmission: an Idea whose Times Has Come", author: John A.C. Bingham, IEEE Communications magazine, May 1990, pp. 5–14.

*Primary Examiner*—Stephen Chin
*Assistant Examiner*—Shuwang Liu

[57] ABSTRACT

A method of allocating bits to discrete frequencies in a discrete multitone modulator comprises the steps of allocating bits to frequencies on a per frequency basis such that the bits are successively allocated until a maximum power level for that frequency is exceeded. Then, a total power level for bits allocated to a plurality of transmit frequencies is calculated to see if a maximum permissible total power level is exceeded. If the maximum permissible total power level is not exceeded, then the process is complete. If the maximum total power level is exceeded, successive bits are removed until the total power level is no longer exceeded. In one bit removal method, bits are removed in order of the amount of power the bit would consume of the transmit power spectrum. The algorithm may be implemented in the combination of transmitter elements including tone ordering circuitry, gain scaling circuitry and the inverse discrete Fourier transform modulator of the discrete multitone data transmitter.

9 Claims, 5 Drawing Sheets

METHOD AND APPARATUS FOR ALLOCATING DATA FOR TRANSMISSION VIA DISCRETE MULTIPLE TONES

BACKGROUND OF THE INVENTION

1. Technical Field

This invention relates to the field of data transmission via discrete multi-tone modulation and, more particularly, to method and apparatus for allocating data for modulation via discrete multiple tones.

2. Description of the Related Arts

In a typical discrete multi-tone modulator, for example, a modulator described by A.N.S.I. Standard T1.413-1995, a plurality of discrete tones are utilized for carrying data modulated thereon. A problem with this approach is that the particular carrier frequencies selected for data modulation may be likewise utilized for, for example, AM radio broadcasts or may already be used by modulators transmitting data on other adjacent cable pairs and the like. Thus, time-varying far end crosstalk and near end crosstalk or cable ingress of noise from external sources can interfere with data transmission of discrete multitone data modulators. For example, in the discrete multi-tone modulation approach, carrier frequencies are spaced approximately every four kilohertz across a broad spectrum of frequencies (for example, from 0–1 megahertz) for data transmission. There may be an AM radio broadcast or a data transmission on an adjacent cable pair at 530 kilohertz that may interfere with a data transmission at approximately the same frequency. The interfering signal creates noise which precludes data transmission at a higher bit carrying capacity than would have been achievable without the presence of the noisy 530 kilohertz interfering signal.

Noise from carrier channels using the same frequencies can thus detract from bit-carrying capacity on those channels. Some tones on the same cable pair can carry more data than other tones (depending on what adjacent cable pairs are carrying and the amount of noise ingress from external sources among other factors). When one views the entire power spectrum, and without any power constraint on the system, one may allocate bits to frequencies freely to fill or pour bits into the power spectrum like water into the peaks and valleys of the spectrum until all frequencies are equally full. In a typical modulator of the multi-tone variety, a channel signal to noise ratio estimation phase is employed. The transmitter sends a known pseudo-random noise sequence to a receiver and the receiver computes the received signal to noise ratio by computing the coherence between the received signal and its stored replica. The characteristics are computed in the form of a ratio of the channel gain to noise for each channel or tone. Let us denote this quantity by gain-to-noise ratio GNR.

Referring briefly to FIG. 1, there is shown such GNR for a series noise spectrum for a series of discrete tones, a+f, a+2f, a+3f . . . , where a represents a displacement frequency from 0 Hertz and f the carrier or tone spacing, for example, approximately 4000 Hz. The GNR plot resembles a "terrain" with peaks and valleys. Some frequencies such as a+f are noisier than other frequencies such as a+6f. Once the GNR is determined, bits are poured into the spectrum (terrain) until a maximum total power level (water level) P is reached. Two power levels, P1 and P2, are shown by way of example. Where a is the initial frequency and f is the tone spacing, then bits are poured on each possible tone until a total power level P is reached above the terrain GNR. For example, for power level P2, bits are poured on or allocated to frequencies: a+2f, a+3f, a+4f, and a+6f. For power level P1, a higher power level, bits may be allocated to all tones except a+7f. This technique is described by Mr. John A. C. Bingham in his paper "Multicarrier Modulation for Data Transmission: An Idea Whose Time Has Come," *I.E.E.E. Communications*, May, 1990, pp. 5–14, incorporated by reference as to its entire contents.

Bingham goes on to describe a 'water filling' bit allocation process that we describe more accurately by the analogy of 'ice cube filling'. Bingham's algorithm adds bits one bit at a time according to selecting a bit for addition to a bin that is the least expensive in additional power needed. Because the bit added represents a chunk of power, we prefer to call the technique "ice cube filling" instead of a more smooth "water pouring" analogy used by Bingham. The "waterfall," bit "pouring," or even the "ice cube filling" technique for allocating bits to tones of a tone or frequency power spectrum has been practiced for years to advantage. Total power is the primary constraint considered in allocating bits to tones in these approaches. However, as these types of techniques have become more predominant, problems have evolved. For example, these approaches do not take into consideration the allocation of a maximum or minimum number of bits to each tone or frequency bin as will be further described herein or consideration of a power mask for each tone as will be defined herein. These additional constraints can be design imposed or imposed by the standard under which the techniques must operate (such as A.N.S.I. standard T1.413-1995) Thus, there has been felt a need to develop other methods for allocating bits to a power spectrum.

SUMMARY OF THE INVENTION

In accordance with the principles of the present invention, bits are allocated to tones by calculating the maximum number of bits per each tone. Then bits are allocated on a tone by tone basis depending on the maximum power at which each tone can be transmitted. Once the bits are allocated, then, the total maximum power level for the tone power spectrum is calculated. If that power level is not exceeded, then, the bit allocation process is complete and the bits may be transmitted. On the other hand, if the total power level has been exceeded, bits are selectively removed from tone or frequency bins until the total power level is no longer exceeded. The first bit that is removed according to one bit removal alternative is that bit that saves the most amount of power. For example and referring to FIG. 1, it may be a bit at the tone, a+3f, or one at the tone, a+6f, depending on which of these saves the greater amount of power. If the total power level is now no longer exceeded, the process of bit removal ends. On the other hand, if the total power level is still exceeded, another bit is removed, likewise having the greatest remaining power savings and so on until the total power level is no longer exceeded.

In an alternative bit removal process, a bit for removal is searched for whose power level value just decreases the total power level to be just less than the maximum total power level for the total tone spectrum. While the transmitted power level will be a maximum and so somewhat more efficient than the first alternative approach to bit removal, it is believed that determining which bit to remove becomes a more computationally intensive process and is thus less preferable than the first alternative discussed above at present.

In summary, the algorithm briefly described above for allocating bits in a multi-tone modulation process permits the consideration of additional constraints, operates faster and generally requires fewer computations than the water pouring or ice cube filling approaches of the prior art.

These and other features of the present invention will be better understood through reference to the drawings and the following detailed description.

DETAILED DESCRIPTION

Figure 2A:
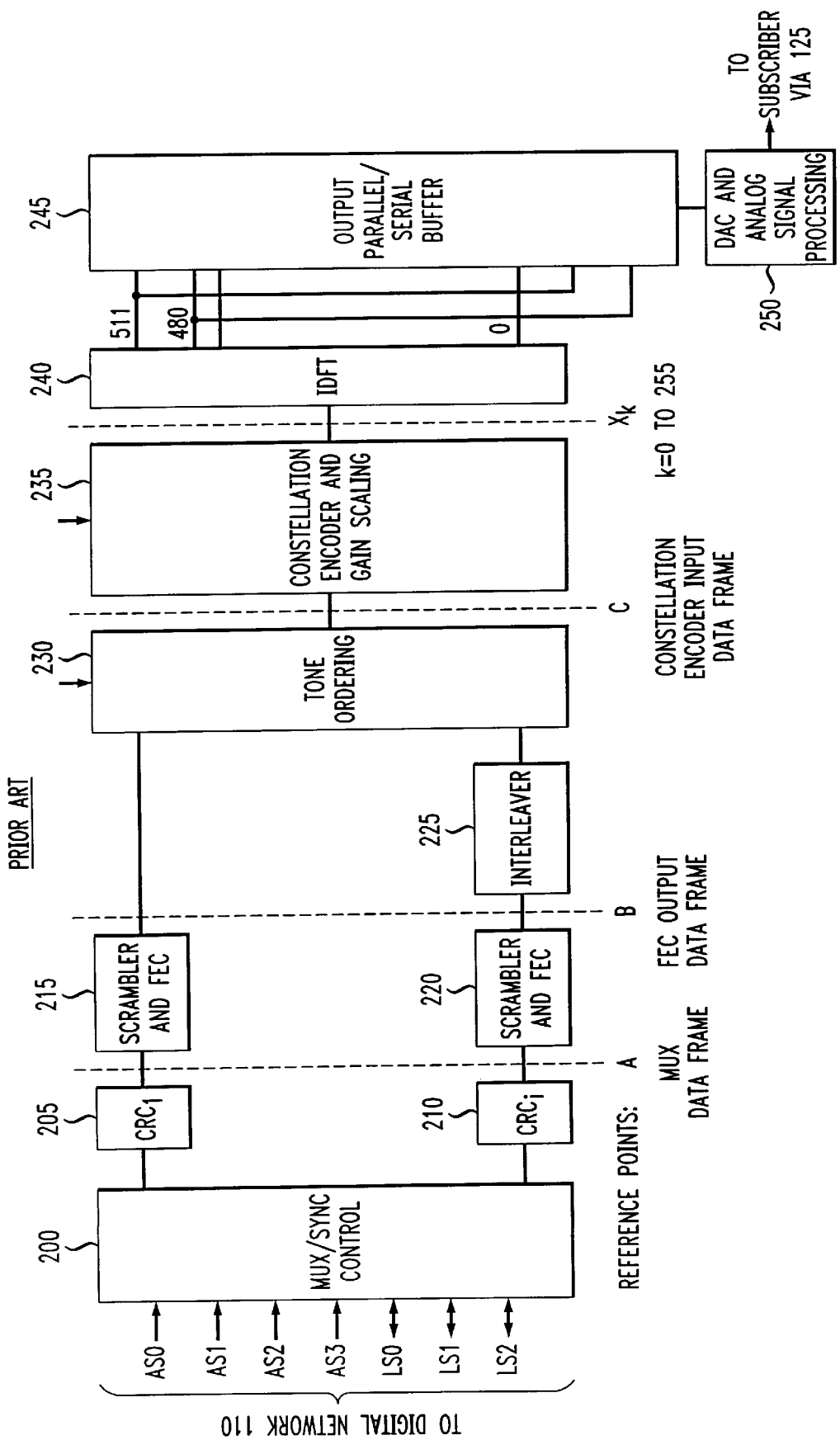
FIG. 2A is a functional block diagram of a typical discrete multi-tone modulator or transmitter according to the prior art (taken from T1.413-1995) in which, to practice the present invention, the tone ordering, gain scaling and IDFT modulation blocks are modified to practice the present invention
Figure 2B:
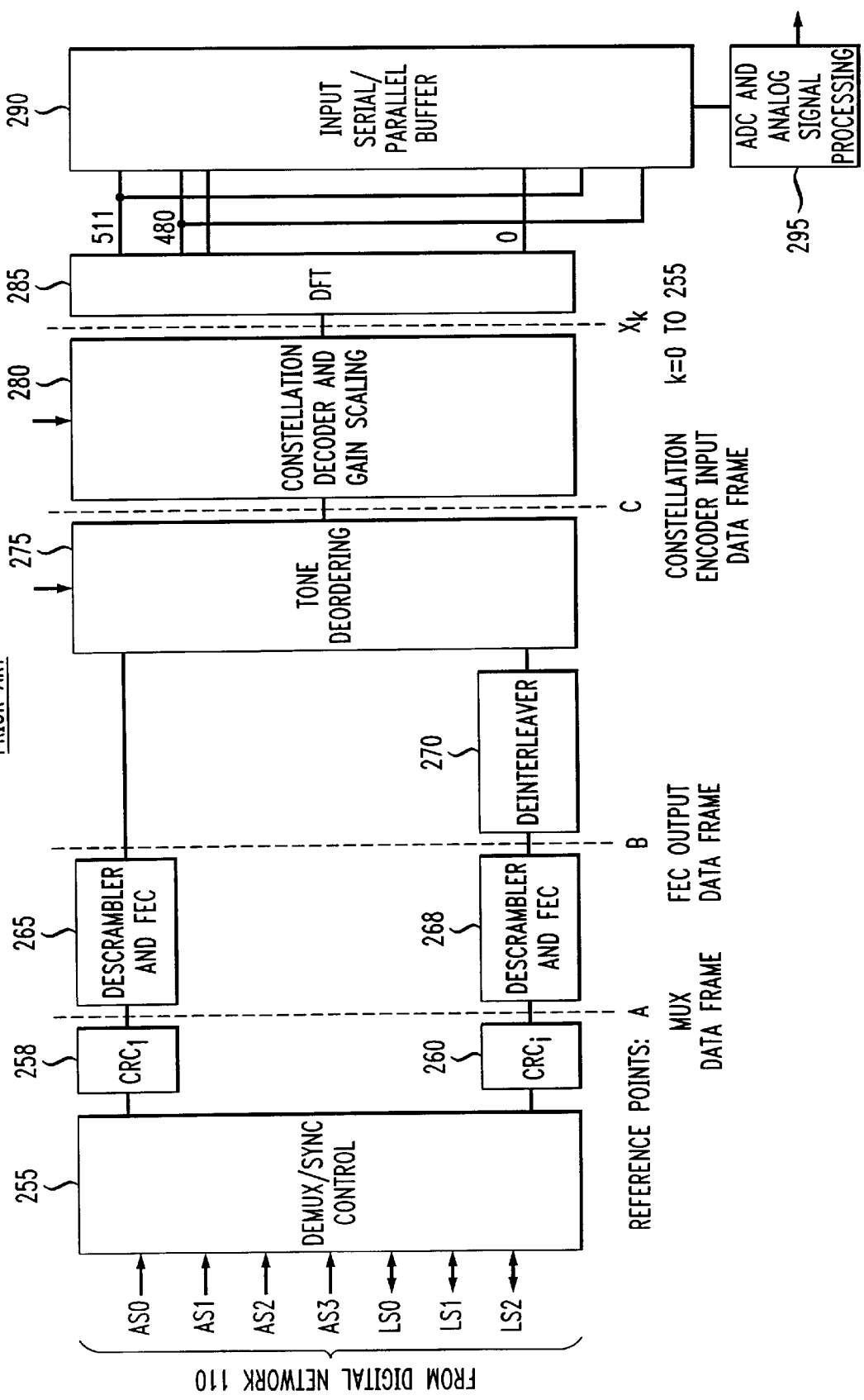
FIG. 2B is a functional block diagram taken from the same reference of a typical receiver/demodulator.

The present invention will now be described with reference to FIGS. 2–4. Referring to FIG. 2A, there is shown respectively an ATU-C transmitter whose reference diagram is taken from A.N.S.I. standard T1.413-1995. ATU-C refers to an Asymmetric Digital Subscriber Line (ADSL) Transmitter Unit at a Central office. A corresponding remote or subscriber unit (ATU-R) would have similar components and is not shown or described herein. The ATU-C typically is utilized on non-loaded high capacity twisted pair cables which may be utilized for transmitting several megahertz of spectral bandwidth. In FIG. 2A, there is shown an expanded functional block diagram of the transmitter portion. FIG. 2B provides a functional block diagram of a receiver portion. A multiplexer/sync control unit 200 provides the interface to the digital network 110. Various high speed data rate links AS0, AS1, AS2 and AS3 at multiples of 1.536 Mbits/sec are provided toward digital network 110. In particular, each AS link represents an independent downstream simplex (unidirectional downstream) bearer of data traffic. Lower speed data services are also shown and represented by LS0 (16 or 64 kbits/sec), LS1 (160 kbits/sec) and LS2 (384 or 576 kbits/sec). Each LS link may represent a duplex bearer (bi-directional) carrying both downstream and upstream traffic or, in the alternative, a unidirectional simplex bearer. For a more thorough understanding of the Figure, the reader is encourged to study ANSI T1.413-1995, incorporated by reference as to any subject matter deemed essential to an understanding of the present invention.

CRC 205 and CRC 210 represent cyclic redundancy check in each direction of transmission. Scrambler and forward error correction 215, 220 represent scrambling and forward error correction in each direction of transmission.

Interleaver 225 provides a data interleaving function as is further described in A.N.S.I. T1.413-1995, incorporated herein by reference as necessary. Tone ordering function 230 provides tone selection and control functions as are also described by A.N.S.I. T1.413-1995. Constellation encoder (if used) and gain scaling functions are represented by block 235. The inverse discrete Fourier transform (IDFT) function applied for data modulation is represented by block 240. Two data directions are shown coupling IDFT 240 and output parallel to serial buffer 245 where a cyclic prefix is added to each data frame. Finally, a digital to analog converter and analog signal processing function are represented by block 250 which interfaces the subscriber facility 125, as indicated above, typically a high capacity twisted wire cable pair.

The present invention is preferably implemented at a controller (not shown) for the blocks entitled tone orderer 230, gain scaler 235 and IDFT 240 or as a component alogirthm or hardware implementtion within one or more of those blocks in combinaiton. Within a controller of these blocks, typically the decision has been made in the past to allocate bits to tones according to the prior art techniques described above known variously as water pouring, waterfalling, ice cube filling and the like. The decision has been made as described above with respect to the discussion of FIG. 1 in the Description of the Related Arts section.

According to the present invention, the following constraints are considered first: the maximum number of bits allowed in each tone or frequency bin for transmission and the maximum power to be transmitted in each bin (or power mask). Then, the total power constraint (power budget) is applied and, if necessary, bits are removed according to a bit removal process.

The maximum number of bits per bin is calculated first according to prior art techniques (FIG. 1) and depending only on the power mask constraint. First the gain-to-noise ratio, GNR, is calculated in an initialization period or periodically as will be further described below. Then, the maximum number of bits that can be allocated to each bin is calculated. This computation is done from a relationship between the number of bits ($b_k$) to be transmitted in a bin k and the power needed to transmit that many bits ($b_k$) in bin number k. For this calculation, the power mask value in bin k is used as the amount of power available in bin k. The overall power constraint comprises two components, an overall constraint that establishes a total constraint, for example, of 100 milliwatts on the cable pair, but, more importantly at this point in the algorithm, a total power limit calculated for each tone or frequency. For example, the power limit for frequencies or tones between 0 and 200 kilohertz must be less than 40 dBm/Hz (a power level referenced to one milliwatt over 1 Hz bandwidth). Above 200 kHz (to frequencies in the megahertz of spectrum), the constraint may be −34 dBm/Hz. This power mask may be dictated by the standard used in a particular country implementing the standard (such as A.N.S.I. standard T1.413-1995). The power mask may also be a design constraint intentionally imposed by a modem designer for some other reason. For example, a designer may intentionally impose a constraint that no more than n bits are to be transmitted on transmit channel frequency, a+10f Similarly, the designer may impose a constraint that a minimum (or maximum) number of bits (or no bits) must be transmitted on a particular tone or frequency. The individual tone or frequency constraint is applied first, then, the total power constraint (the power budget) is applied.

Once all the transmit frequency or tone bins are filled with bits and may be overflowing from following the constraint of filling the bins until their individual power level is met, the total power constraint (or power budget for all tones), for example, of 100 milliwatts is applied. This 100 milliwatt total maximum power constraint is the total maximum power level for bit transmission on all the frequencies utilized where the 100 milliwatts parameter is dictated by the A.N.S.I. standard. Following another standard, the maximum total power level (or power budget) may be different. If the total maximum power is not exceeded, then, the algorithm is complete. On the other hand, if the total power limit is exceeded, then a bit removal process follows.

Figure 1:
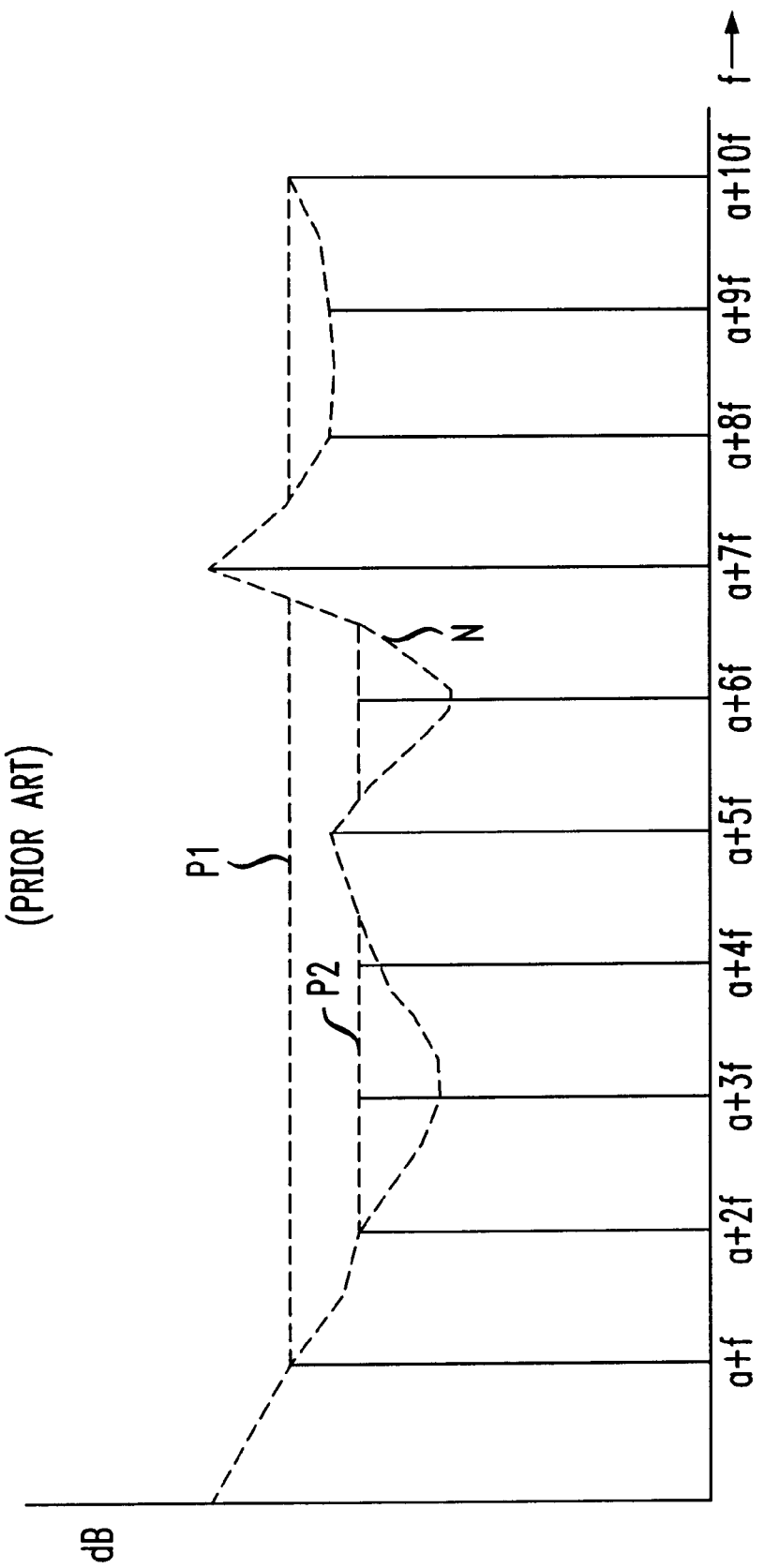
FIG. 1 is a drawing for describing the prior art technique of bit allocation in a multi-tone modulator of "pouring" bits on tones or into frequency bins until a maximum power level P (P1 or P2) for the entire spectrum (analogously, a water level) is exceeded.

According to a presently preferred bit removal process, bits are removed according to the most power saved by its removal. The first bit removed then is the bit from the frequency bin with the most power saved in comparison with the bits of all other frequencies or frequency bins, and the corresponding power saved is subtracted from the total power. If the total power constraint is still exceeded after removal of the first bit, the next most power consuming bit is removed. With each bit removed, the comparison with the total power constraint (or power budget) is made until the power constraint is no longer exceeded and the algorithm is done. Referring to FIG. 1, if a power level P1 is the present power level, one may select the bit from bin a+3f as the most power consuming bit. After that bit is removed, and if the total power level is still exceeded, the next bit that may be removed may be a bit from the bin a+6f Since the approach to bit removal suggested here removes chunks of power, it may come to be called an ice cube removal technique.

Figure 3:
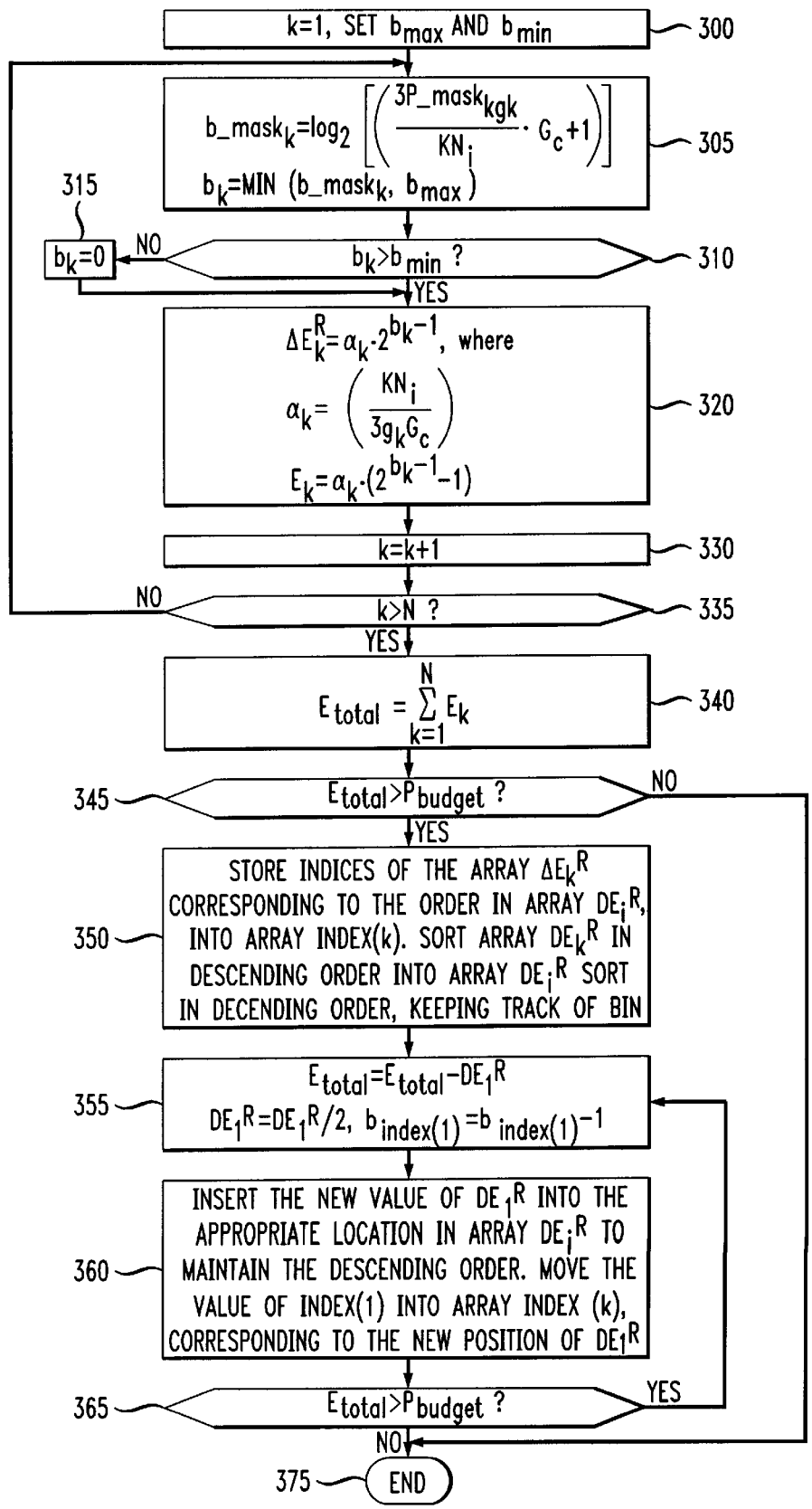
FIG. 3 is a flowchart of the algorithm of the present invention, showing a method of allocating bits first to fill up each channel according to a maximum number of bits and a maximum power per channel and then, if a total power level (power budget) for the entire spectrum is exceeded, removing bits one at a time until the total power level permitted is no longer exceeded.
Figure 4:
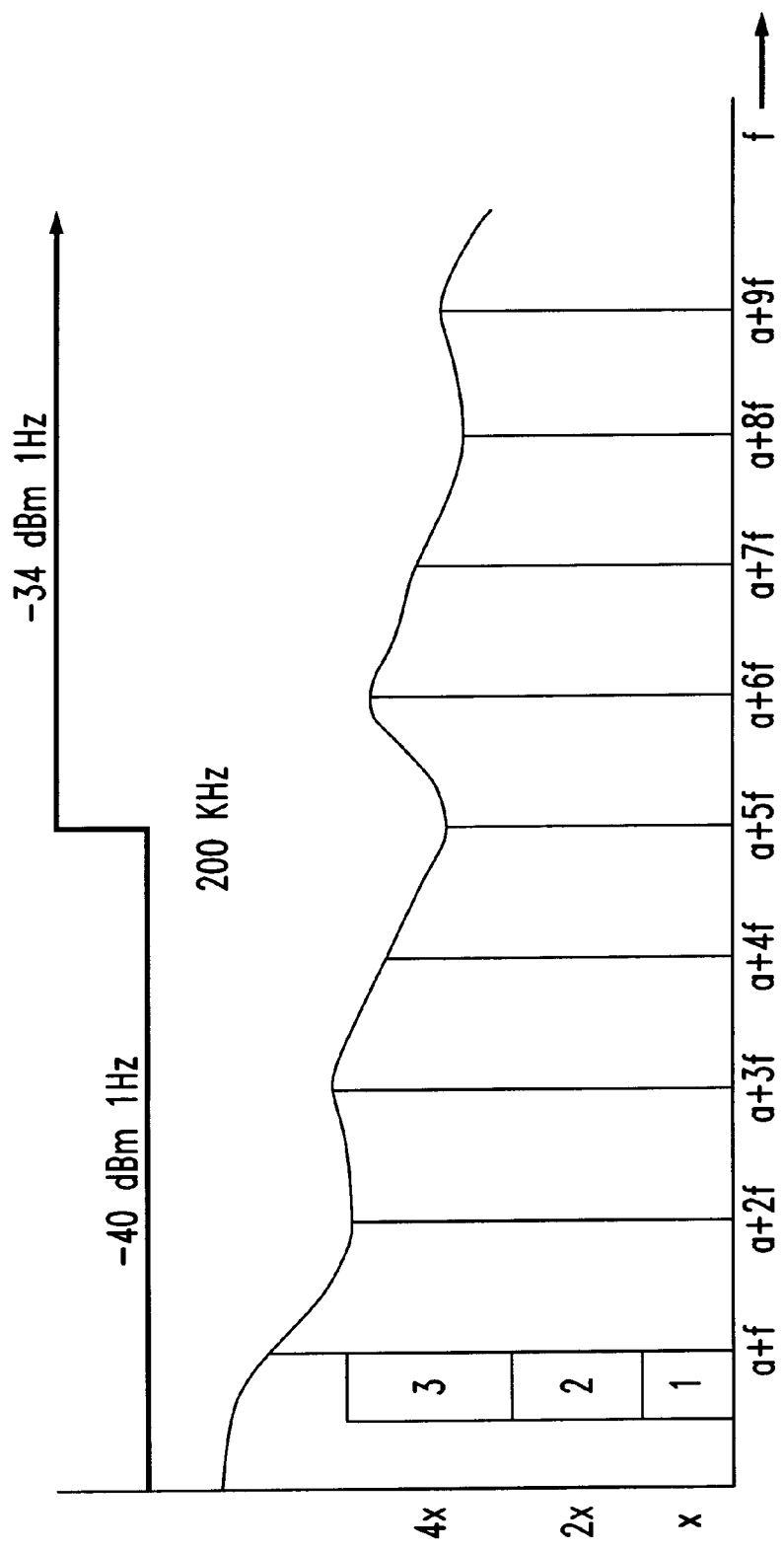
FIG. 4 shows the application of the present invention to a typical power mask and tone or bin arrangement with increasing frequency versus power where 7× represents the power for three bits at frequency a+f.

Having briefly described the algorithm of the present invention, the algorithm will be further explained in considerable detail with reference to FIGS. 3 and 4. The example power mask of −40 dBm/Hz changing to −34 dBm/Hz at 200 kilohertz is shown at top. A one dimensional matrix for N frequencies where N is typically around 255 different frequencies (for A.N.S.I. T1.413-1995) is formed and stored in memory. Each entry in the matrix is the maximum number of bits for that frequency. The algorithm of the present invention first computes the bit distribution (or allocation) within the constraints of the power spectrum mask shown in FIG. 4 and the maximum number of bits in a bin, but without the total power constraint (or power budget). Initialization step 300 to final bin step 335 of FIG. 3 comprise the initial steps of allocating bits to frequencies.

The bit allocation steps for allocating bits to a particular frequency bin 300–335 take into consideration constraints of 1) the maximum number of bits allowed in each bin and 2) the maximum power level permitted for that frequency (for example, by calculating a power level from the constraint −40 dBm/Hz for frequencies less than 200 kilohertz and −34 dBm/Hz for frequencies greater than 200 kilohertz). The first constraint may be set by a modulator designer divorced from a standard. It may be set as a minimum or maximum number of bits per frequency or both (i.e. a range of permissible number of bits).

Then, the total power needed to transmit the number of bits is calculated at step 340. If the total power required is less than the power budget (for example, 100 milliwatts), then the bit allocation function is necessarily completed. If the total power is greater than the budgeted power at step 345, then the algorithm needs to reduce the bits to be transmitted in order to operate within the power budget constraints by following steps 350–365.

In order to achieve the objective of reducing the bits transmitted to satisfy the maximum total power constraint, the algorithm first sorts the array of power saved by removing one bit in each frequency bin at step 350. Algorithm efficiency can be achieved by employing a partial sorting technique that finds the array element with the maximum power saved without resorting to further sorting the array. The algorithm calculates the cost of the last bit (in terms of power saved by removing one bit) in each bin and then removes the bit from the bin that is the most expensive in terms of the additional power. This process 355, 360, 365 is continued until the total power level consumed is no greater than the total power budget, for example, of 100 milliwatts at step 365. Finally at step 375, the algorithm is done (the allocated bits may be transmitted).

The process of allocating bits to frequency bins (per FIG. 3) should be repeated periodically during the day as conditions change. Traffic, for example, slows in the early morning hours, so noise decreases and data transmission can reach maximum levels. The character of traffic on a given cable pair may change from, for example, voice traffic to data traffic. Even if data traffic is assumed, the data carrying demand may change, for example, in an available bit rate or variable bit rate kind of data scenario. Thus, it is recommended that the bit allocation process be performed at least twice a day, and, it may be advantageous to perform the bit allocation procedure as frequently as every minute to take advantage of predictable, periodic changes in traffic patterns.

A review of the following will assist in understanding the bit-by-bit allocation and bit removal process briefly described above from reference to FIG. 3. The relationship between the number of bits in a frequency bin and the power needed to transmit that number of bits by uncoded quadrature amplitude modulation (QAM), for a specified bit error rate (BER) at a receiver, for which $$\frac{g}{N_k}$$

is the measured profile, where g is the channel gain and N is the noise at frequency k is given by the following expression:

$$E_k = (2^{b_k} - 1) \cdot \left( \frac{KN_k}{3g_k G_c} \right),$$

where:

$b_k$ is the number of bits carried in frequency bin k, $E_k$ is the power required in bin k to transmit the $b_k$ bits, $g_k/N_k$ is the measured gain to noise ratio in bin k.

K is given by:

$$K = \left[ Q^{-1} \left( \frac{P_e}{N_e} \right) \right]^2,$$

where $P_e$ is the error probability given by:

$$P_e = 4 \left( 1 - \frac{1}{\sqrt{2^{n_i}}} \right) Q \left[ a \sqrt{\frac{2}{N_0}} \right],$$

$N_k$=Noise Power

In the above equations, $P_e$ is the bit error rate (BER), $N_e$ is the number of nearest neighbors, and the Q-function, Q(x) is defined as the partial integral of the normal distribution function as follows:

$$Q(x) = \int_x^\infty \frac{1}{\sqrt{2\pi}} \cdot e^{\frac{-u^2}{2}} \cdot du$$

Now consider a code gain value of $G_c$ to apply an effective amplification factor in Eq. 1.

$$b_k = \log_2\left[\left(\frac{3E_k g_k}{KN_k} \cdot G_c + 1\right)\right] \qquad \text{Eq. 2}$$

The above equation can be inverted to express the power in terms of the number of bits as follows:

$$E_k[b_k bits] = (2^{bk} - 1) \cdot \left(\frac{KN_k}{3g_k G_c}\right) \Delta (2^{bk} - 1) \cdot \alpha_k \qquad \text{Eq. 3}$$

The power needed to transmit one additional bit in bin k, that already contains $b_k$ bits, for the K determined by the desired $P_e$ can be derived to be:

$$\Delta E_k^A = E_k[(b_k+1)bits] - E_k[b_k bits] \qquad \text{Eq. 4}$$
$$= [(2^{bk+1} - 1) - (2^{bk} - 1)]\alpha_k$$
$$= \alpha_k \cdot 2^{bk}$$

This quantity is also the power that would be saved if the number of bits in bin k is reduced from $b_k+1$ bits to $b_k$ bits. In other words, if the bin contains $b_k$ bits, then the power saved by removing one bit from that bin is equal to the following:

$$\Delta E_k^R = \alpha_k \cdot 2^{bk} - 1 \qquad \text{Eq. 5}$$

This relationship leads to two different bit allocation algorithms:

1. Each additional bit in a particular bin requires twice the amount of power needed as for the last bit that was added to the bin (briefly refer to FIG. 4 for seeing how each new bit at a given frequency costs twice the previous power). That is, from equation 4 above, if $b_k$ is increased by 1 to ($b_k$+1), then $\Delta E_k$ is doubled. Therefore, one version of a bit allocation algorithm is to calculate the power needed to add one more bit to each of the bins, then add a bit to that bin which requires the least amount of incremental power for the additional bit. The bit added is the least expensive bit in terms of incremental power needed. Then, one must recalculate the power needed to add one more bit to this bin and then continue adding the least expensive bits to bins at each incremental stage, until the budgeted power is used up or any one of the constraints, maximum number of bits or maximum power spectrum mask is met. An algorithm following this strategy is suggested by Bingham except that Bingham does not consider the additional constraints of transmit power spectrum mask and the maximum/minimum number of bits to be transmitted in one frequency channel.

2. The second version of the algorithm is based upon removing bits. First, fill each frequency bin with the lesser of either the maximum allowable number of bits in one bin or the number of bits in one bin that corresponds to transmitting the maximum allowable power as prescribed by the power mask. Perform this bit allocation without any consideration for the total power budget (steps 300–335). Then sum the power required over all the bins (step 340). If the total power is greater than the budgeted power, then remove bits one at a time until the power budget is met (steps 350–365). For example, remove bits one at a time in an order that corresponds to removing the most expensive bit in terms of power saved.

The algorithm that is a subject of the present invention is in accordance with the second approach. The steps in this algorithm again are as follows:

1. Steps 305–315. For each k and according to equation 2, compute the maximum number of bits that can be transmitted within that bin subject to the two constraints that the power in the bin must be no greater than $P\_mask_k$ and that the number of bits can be no greater than $b_{max}$. This is achieved by substituting $P\_mask_k$ for $E_k$ in Eq. 2 to calculate $b\_mask_k$ and using the smaller of $b_{max}$ and $b\_mask_k$ as the number of bits in bin k. If $b_k$ is less than $b_{min}$, then use $b_k=0$, where $b_{min}$ is the minimum number of bits (other than 0 bits) to be transmitted in any bin.

$$b_k = \text{MIN}(b\_mask_k, b_{max}) \qquad \text{Eq. 6}$$

2. Steps 330–335. Calculate the value of $E_k$ for all k according to equation 3.

3. Step 340. Set the total power used, $E_{total}$, to the sum of all values of $E_k$.

4. Step 345. If $E_{total}$<P_budget, then bit allocation as calculated above is complete and go to step 12. On the other hand, if $E_{total}$<P_budget, then go to step 5.

5. Step 350. Compute the array of 66 $E_k$ for all k according to Eq. 5, using the value of bk in bin k, as calculated in step 1.

6. Step 350. Sort the array of $\Delta E_k$, in descending order so that the bin element with index=1 corresponds to the bin that would yield the largest savings in power if one bit from that bin is removed. The sorting operation needs to be performed only initially. For subsequent steps, only the value of one bin changes and the bin that changes value will be pushed into the appropriate new position in the array in step 10, below.

In the following steps, the subscripts refer to the sorted array.

7. Step 350. Reduce the number of bits in bin index=1 by one.

8. Step 355. Reduce the value of $E_{total}$ by $\Delta E_1$.

9. Step 355. Calculate the new value of $\Delta E_1$ as per Eq. 5 using the value of $b_1$ reduced by 1. Note that the new value of $\Delta E_1$ is half the old value of $\Delta E_1$.

10. Step 355. Insert element 1 (the first element in the array) to the appropriate new position in the array of descending values of incremental power as determined by the new and smaller by half value of $\Delta E_1$. After this insertion in the array, the first element in the array again refers to another bin that would save the largest amount of power by the removal of one bit from that frequency bin. (Note that the first element even after being reduced by the factor of 2 in step 6 may still remain in the first position, even after re-ordering, if the original value of $\Delta E_1$ was greater than twice the value of the second element in the array.)

11. Step 365. Go to step 5.

12. Step 375. Exit algorithm. Depending on the environment and circumstances, the bit allocation algorithm should be periodically performed within a twenty-four hour day. Conditions such as amount and type of telecommunications traffic change during the day as do external noise influences such as radio broadcast stations and the like.

The algorithm detailed above will determine the maximum number of bits that can be transmitted in one DMT symbol (for example, 8 bits) since the algorithm expends power in the most efficient way. Moreover, the algorithm also applies the constraints that ought to be applied in a practical implementation of the ADSL modem using DMT modulation technology. That is, the constraints consisting of power spectrum mask, the limits on the minimum or maximum number of bits or range of bits to be transmitted in one frequency bin and the discrete levels of power required to transmit integer bits.

FIG. 4 is a graph of signal power and the individual frequency power constraint mask. At left, an exemplary bit allocation for the frequency bin a+f is shown whereby the first bit has a power level x, but with the addition of the next bit, twice the power level is added or 2x. With the third bit, twice the cumulative power level is added again or 3x more for a total of six times the power with three bits added. At the top of the graph is shown the power mask constraint that no power level on any given frequency below 200 kilohertz should exceed −40 dBm (where m is one milliwatt). No power level on frequencies above 200 kilohertz should exceed −34 dBm per A.N.S.I. standard T1.413-1995.

Thus there has been shown and described a method and apparatus for allocating bits to frequencies in a discrete multitone transmitter for use in digital subscriber loop data transmission which meets the objectives and features sought including being a faster, more efficient algorithm than a known water pouring algorithm that also considers constraints such as maximum power per frequency channel, power per bit and maximum or minimum numbers of bits per frequency bin. Any patent application or United States patent referenced herein should be deemed to be incorporated by reference as to its entire contents. The present invention should only be deemed to be limited by the scope of the claims that follow.

What we claim is:

1. A method for use in a data modulator for allocating bits to data channel frequencies comprising the steps of allocating bits to frequencies on a per frequency basis, whereby bits are successively allocated until a maximum power level for that frequency is exceeded, calculating a total power level for bits allocated to a plurality of transmit frequencies, and if the total power level is exceeded, removing successive bits until the total power level is no longer exceeded.

2. A method as recited in claim 1 wherein said bit allocation step comprises the steps of determining a channel gain versus noise characteristic for each transmit frequency and allocating bits to each transmit frequency, one at a time, in order of least expensive to most expensive in terms of power consumed by the allocated bit.

3. A method as recited in claim 1 wherein said bit allocation step comprises the step of calculating a maximum power level per transmit frequency depending on a predetermined power level permitted for that frequency.

4. A method as recited in claim 1 wherein said bit allocation step comprises the steps of determining a channel gain versus noise characteristic for each transmit frequency and allocating bits to each transmit frequency, one at a time, according to a predetermined maximum number of bits for a particular frequency.

5. A method as recited in claim 1 wherein said step of removing bits comprises the step of removing a bit saving the greatest amount of power.

6. A method as recited in claim 1 wherein said step of removing bits comprises the step of removing a bit saving that amount of power which reduces the total power level to not exceed the maximum total power level.

7. A method as recited in claim 1 wherein said step of allocating bits to frequencies comprises the step of storing a one dimensional array of length N where N is equal to the number of frequency bins and the value of each position of the array is equal to the maximum number of bits to be transmitted.

8. A method as recited in claim 1 wherein said bit allocation step comprises the steps of determining a channel gain versus noise characteristic for each transmit frequency and allocating bits to each transmit frequency, one at a time, according to a predetermined minimum number of bits for a particular frequency.

9. Apparatus for allocating bits for data transmission via a plurality of discrete frequencies comprising tone ordering circuitry, gain scaling circuitry and an inverse discrete Fourier transform modulator, said apparatus for allocating bits to frequencies on a per frequency basis, whereby bits are successively allocated until a maximum power level for that frequency is exceeded, calculating a total power level for bits allocated to a plurality of transmit frequencies, and if the total power level is exceeded, removing successive bits until the total power level is no longer exceeded.

* * * * *